(12) United States Patent
Han et al.

(10) Patent No.: US 10,057,467 B2
(45) Date of Patent: *Aug. 21, 2018

(54) CAMERA MODULE FOR VEHICLE

(75) Inventors: Sangyeal Han, Seoul (KR); Bumsig Cho, Seoul (KR); Daeseung Kim, Seoul (KR); Seungho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 493 days.

This patent is subject to a terminal disclaimer.

(21) Appl. No.: 14/357,110

(22) PCT Filed: Jun. 26, 2012

(86) PCT No.: PCT/KR2012/005018
§ 371 (c)(1),
(2), (4) Date: May 8, 2014

(87) PCT Pub. No.: WO2013/069866
PCT Pub. Date: May 16, 2013

(65) Prior Publication Data
US 2014/0320657 A1  Oct. 30, 2014

(30) Foreign Application Priority Data
Nov. 8, 2011  (KR) .................. 10-2011-0115998

(51) Int. Cl.
H04N 5/225 (2006.01)
B60R 11/04 (2006.01)

(52) U.S. Cl.
CPC ........... *H04N 5/2254* (2013.01); *B60R 11/04* (2013.01); *H04N 5/2253* (2013.01); *H04N 5/2257* (2013.01); *H04N 5/2252* (2013.01)

(58) Field of Classification Search
CPC .. H04N 5/2254; H04N 5/2253; H04N 5/2252; H04N 5/2257; B60R 11/04
(Continued)

(56) References Cited

U.S. PATENT DOCUMENTS 3,066,367 A * 12/1962 Garman .................... F16B 5/06
                                                          174/158 R
4,008,938 A    2/1977 Anhalt et al.
(Continued)

FOREIGN PATENT DOCUMENTS

CN  1873528 A    12/2006
CN  100537302 C   9/2009
(Continued)

OTHER PUBLICATIONS

International Search Report in International Application No. PCT/KR2012/005018, filed Jun. 26, 2012.
(Continued)

*Primary Examiner* — Tung Vo
*Assistant Examiner* — Joseph Becker
(74) *Attorney, Agent, or Firm* — Saliwanchik, Lloyd & Eisenschenk

(57) ABSTRACT

A camera module for a vehicle according to the present invention includes a first Printed Circuit Board (PCB) configured to have an image sensor mounted on its surface; a second PCB configured to supply a power source to the first PCB; an outer shield installed to surround the side of the first and the second PCBs and to shield the first and the second PCBs from electromagnetic interference (EMI); and a plurality of support units disposed at positions where the supports units interfere with the first and the second PCBs of the outer shield and configured to support the first and the second PCBs.

21 Claims, 2 Drawing Sheets

(58) Field of Classification Search
USPC .......................................................... 348/148
See application file for complete search history.

(56) References Cited

U.S. PATENT DOCUMENTS

| | | | |
|---|---|---|---|
| 7,223,125 B2 | 5/2007 | Chen | |
| 8,982,273 B2* | 3/2015 | Bingle | .......................... 348/148 |
| 2006/0189183 A1* | 8/2006 | Yang | ................. H01R 13/5025 |
| | | | 439/95 |
| 2007/0252910 A1* | 11/2007 | Gottwald | ................ B60R 11/04 |
| | | | 348/373 |
| 2008/0024883 A1 | 1/2008 | Iwasaki | |
| 2011/0134303 A1* | 6/2011 | Jung | ................. H01L 27/14618 |
| | | | 348/340 |

FOREIGN PATENT DOCUMENTS

| | | |
|---|---|---|
| JP | H06132447 A | 5/1994 |
| JP | 2008-035215 A | 2/2008 |
| JP | 2008270106 A | 11/2008 |
| KR | 10-2006-0125569 A | 12/2006 |
| KR | 10-2006-0125570 | 12/2006 |
| KR | 10-0876109 B1 | 12/2008 |
| KR | 10-2010-0112810 A | 10/2010 |

OTHER PUBLICATIONS

Partial European Search Report in European Application No. 12846979.8.
Notice of Allowance dated Apr. 11, 2017 in U.S. Appl. No. 14/644,898.

* cited by examiner

[Fig. 1]
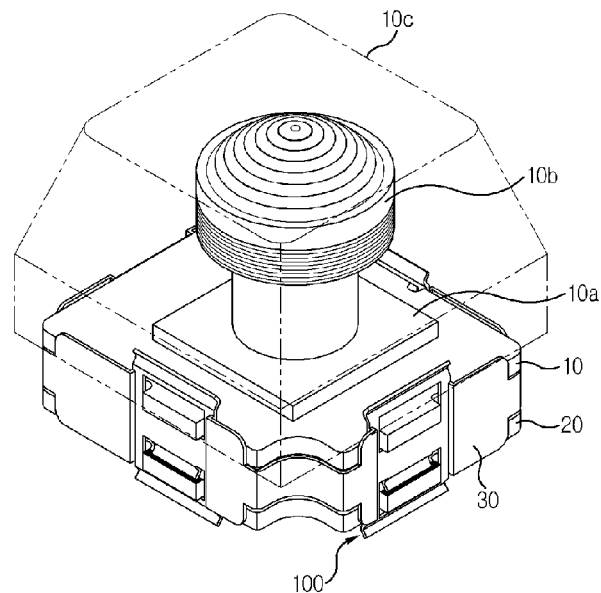
[Fig. 2]
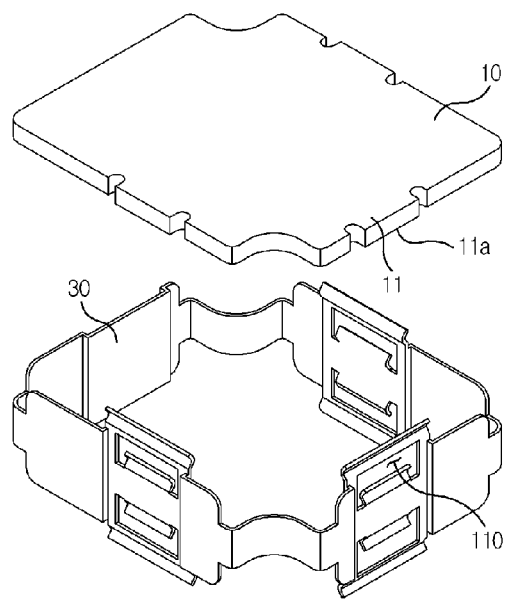
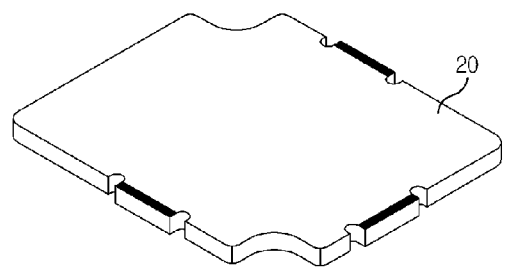

[Fig. 3]
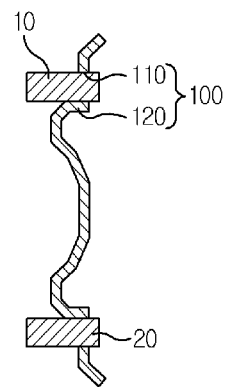
[Fig. 4]
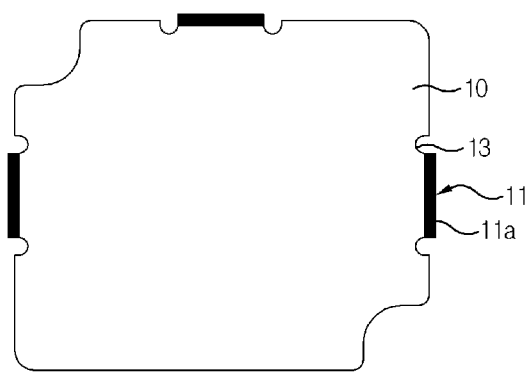

CAMERA MODULE FOR VEHICLE

CROSS-REFERENCE TO RELATED APPLICATIONS

This application is the U.S. national stage application of International Patent Application No. PCT/KR2012/005018, filed Jun. 26, 2012, which claims priority to Korean Application No. 10-2011-0115998, filed Nov. 8, 2011, the disclosures of each of which are incorporated herein by reference in their entirety.

TECHNICAL FIELD

The present invention relates to a camera module used in a vehicle.

BACKGROUND ART

A camera module for capturing an image is recently being used a lot under the influence of a high degree and automation of vehicle parts. A typical example is front and rear monitoring cameras and a camera module used in a black box, etc.

As an example of this camera module for a vehicle, Korean Patent Laid-Open Publication No. 2006-0125570 (Dec. 6, 2006) discloses a camera structure mounted on a vehicle, including a camera unit configured to capture images around a vehicle and a connector unit connected and fixed to the camera unit and configured to supply a power source and to transmit and receive data.

The camera unit constructed in the prior art document uses a plurality of screws in order to fix a sensor Printed Circuit Board (PCB) on which an image sensor is mounted and a power PCB for supplying a power source to a housing.

If the sensor and the power PCB are combined using the screws as described above, the time taken to perform an assembly process is increased and the optical axis of a lens may be twisted because of rotation moment resulting from force applied to fasten the screws when the optical axis is adjusted.

Furthermore, the area on which the parts of the PCBs are mounted may be limited because screw holes must be formed in each of the PCBs in order to combine the sensor and the power PCB.

Furthermore, additional spacers for spacing must be installed in the sensor and the PCBs because a specific interval needs to be maintained in order to exclude interference between heat-dissipation and mounting devices. Accordingly, ground processing must be additionally performed because the spacers interfere with each of the PCBs.

DISCLOSURE OF INVENTION

Technical Problem

An object of the present invention is to provide a camera module for a vehicle having an improved structure, which is capable of fixing and supporting plural sheets of PCBs at once with the PCBs spaced apart from each other even without additional spacers and screws.

Solution to Problem

A camera module for a vehicle according to the present invention includes a first Printed Circuit Board (PCB) configured to have an image sensor mounted on its surface; a second PCB configured to supply a power source to the first PCB; an outer shield installed to surround the side of the first and the second PCBs and to shield the first and the second PCBs from electromagnetic interference (EMI); and a plurality of support units disposed at positions where the supports units interfere with the first and the second PCBs of the outer shield and configured to support the first and the second PCBs.

It is preferred that each of the support units include a through hole formed to penetrate the outer shield, formed in the surface of a wall of the outer shield, and configured to accommodate a support protrusion protruded from the side of the first and the second PCBs; and a tension spring formed by partially bending the sidewall face of the outer shield and configured to support a face where the tension spring faces the support protrusion of the through hole.

Furthermore, it is preferred that each of pairs of the support units be symmetrically disposed on the sidewall face of the outer shield up and down and configured to support the first and the second PCBs simultaneously.

Here, it is preferred that the support protrusion include a ground terminal unit plated with conductive material and formed at a position where the support protrusion interferes with the tension spring.

It is preferred that the outer shield be integrally formed with conductive material.

Meanwhile, the camera module for a vehicle according to an exemplary embodiment of the present invention may further include a lens module disposed over the first PCB and configured to transfer an image to the image sensor; and a cover member configured to cover a top of the lens module and the first PCB.

It is preferred that the support units support at least three faces of the first and the second PCBs and space the first and the second PCBs from each other at a specific interval.

Advantageous Effects of Invention

According to the present invention, plural sheets of PCBs can be fixed and supported at once with the PCBs spaced apart from each other even without additional spacers and screws.

BRIEF DESCRIPTION OF DRAWINGS

FIG. 1 is a diagram showing an example of a camera module for a vehicle according to an exemplary embodiment of the present invention;

FIG. 2 is an exploded perspective view of first and second PCBs and an outer shield shown in FIG. 1;

FIG. 3 is a cross-sectional view of FIG. 2; and

FIG. 4 is a rear view of the first PCB according to an embodiment of the present invention.

BEST MODE FOR CARRYING OUT THE INVENTION

Exemplary embodiments of the present invention are described below with reference to the accompanying drawings.

FIG. 1 is a diagram showing an example of a camera module for a vehicle according to an exemplary embodiment of the present invention, FIG. 2 is an exploded perspective view of first and second PCBs and an outer shield shown in FIG. 1, FIG. 3 is a cross-sectional view of FIG. 2, and FIG. 4 is a rear view of the first PCB according to an embodiment of the present invention.

As shown, the camera module for a vehicle according to the exemplary embodiment of the present invention includes a first PCB 10, a second PCB 20, an outer shield 30, and support units 100.

The first PCB 10 has an image sensor 10a mounted on its top surface and configured to sense external image information. The second PCB 20 is spaced apart from the first PCB 10 at a specific interval and is disposed at the bottom of the first PCB 10. It is preferred that the second PCB 20 be disposed in a module for supplying a power source to the first PCB 10.

Meanwhile, the camera module for a vehicle according to the exemplary embodiment of the present invention may further include a lens module 10b disposed over the first PCB 10 and configured to transfer an image to the image sensor 10a and a cover member 10c configured to cover the upper side of the image sensor 10a, the lens module 10b, and the first PCB 10, as shown in FIG. 1. The elements may be changed according to a construction.

The outer shield 30 is formed to surround the side of the first and the second PCBs 10 and 20 and configured to shield the first and the second PCBs 10 and 20 from electromagnetic interference (EMI). To this end, it is preferred that the sidewall face of the outer shield 30 be configured to have a value greater than the sum of the thickness of the first and the second PCBs 10 and 20 and an interval between the first and the second PCBs 10 and 20, as shown in FIGS. 1 and 2.

It is also preferred that the outer shield 30 be formed of one body made of conductive metal material. The outer shield 30 may prevent a malfunction of the camera module due to a disturbance of external electromagnetic waves and the influence of electro-magnetic waves, occurring when the camera is operated, on peripheral parts by absorbing electromagnetic waves generated from the first and the second PCBs 10 and 20 and electromagnetic waves induced from the outside to the first and the second PCBs 10 and 20.

It is preferred that the support units 100 be integrally formed with the outer shield 30 and placed at positions where the support units 100 interfere with the first and the second PCBs 10 and 20. The support units 100 support the first and the second PCBs 10 and 20. It is preferred that a plurality of the support units 100 be provided in the circumference of the first and the second PCBs 10 and 20, as shown in FIG. 2.

Each of the support units 100 includes a through hole 110 and a tension spring 120.

The through hole 110 is formed to penetrate the outer shield 30, formed in the surface of a wall of the outer shield 30, and configured to accommodate a support protrusion 11 protruded from the side of the first and the second PCBs 10 and 20. The support protrusion 11 is formed approximately at the central part of the circumferential face of each of the first and the second PCBs 10 and 20. As shown in FIG. 4, concave grooves 13 having a specific depth are formed in the circumferential face of each of the first and the second PCBs 10 and 20 so that the support protrusion 11 has a protruding shape different from other peripheral circumferential faces.

The tension spring 120 is formed by partially bending the sidewall face of the outer shield 30. The tension spring 120 is disposed to face the support protrusion 11 passing through the through hole 110, thus elastically supporting the face where the tension spring 120 faces the support protrusion 11.

Furthermore, it is preferred that each of pairs of the support units 100 be symmetrically disposed on the sidewall face of the outer shield 30 up and down so that the pair of support units 100 support the first and the second PCBs 10 and 20 at the same time with the first and the second PCBs 10 and 20 spaced apart at a specific interval, as shown in FIGS. 2 and 3.

Meanwhile, it is preferred that the support protrusion 11 include a ground terminal unit 11a plated with conductive material and formed at a position where the support protrusion 11 interferes with the tension spring 120. The ground terminal unit 11a is connected to the outer shield 30 made of the metal material so that the ground terminal unit 11a may conduct electricity to the outer shield 30. Accordingly, electromagnetic waves and remaining electricity generated from the first and the second PCBs 10 and 20 may be grounded through the outer shield 30.

It is preferred that the support units 100 constructed as described above support at least three faces of the first and the second PCBs 10 and 20, as shown in FIGS. 2 and 3. Accordingly, the first and the second PCBs 10 and 20 can be spaced apart from each other at a specific interval or more even without additional spacers.

Furthermore, as shown in FIG. 3, the first and the second PCBs 10 and 20 may be spaced apart from each other by the length of the tension springs 120 because they are supported over and under the plural pairs of tension springs 120. Accordingly, the first and the second PCBs 10 and 20 can be spaced apart from each other at a specific interval even without using parts, such as additional spacers.

The embodiments of the present invention described above and shown in the drawings should not be construed as limiting the technical spirit of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

INDUSTRIAL APPLICABILITY

A camera module for a vehicle according to the present invention may be used as a camera module for monitoring the front and rear of a vehicle.

The invention claimed is:

1. A camera module for a vehicle, comprising:
a first PCB (printed circuit board) including a first ground portion;
a second PCB including a second ground portion spaced apart from the first ground portion; and
an outer shield including a tension spring bent at a portion of a first lateral surface of the outer shield,
wherein the tension spring includes a first tension spring and a second tension spring spaced apart from the first tension spring,
wherein the first tension spring is in contact with the first ground portion,
wherein the second tension spring is in contact with the second ground portion, and
wherein each of the first ground portion and the second ground portion includes conductive material,
wherein the first lateral surface of the outer shield comprises a first hole and a second hole, and
wherein a part of the first tension spring is disposed in the first hole and a part of the second tension spring is disposed in the second hole.

2. The camera module of claim 1, wherein the first ground portion and the second ground portion are each formed at a lateral surface of the first and second PCBs, an upper surface of the first and second PCBs, or a bottom surface of the first and second PCBs.

3. The camera module of claim 2, wherein the first PCB comprises a plurality of ground portions formed along a circumference of the first PCB, and wherein the second PCB comprises a plurality of ground portions formed along a circumference of the second PCB.

4. The camera module of claim 1, wherein the first and second tension springs support the first and second ground portions, respectively.

5. The camera module of claim 2, wherein the first hole and second hole are vertically arranged in a pair on the first lateral surface of the outer shield.

6. The camera module of claim 1, wherein each of the first and second PCBs has a shape corresponding to that of the outer shield.

7. The camera module of claim 1, wherein the outer shield is conductively connected to the first and second ground portions, and wherein the first and second PCBs are configured to be grounded via the outer shield.

8. The camera module of claim 1, further comprising:
a lens module;
an image sensor; and
a cover member configured to cover the lens module, the image sensor, and an upper surface of the first PCB.

9. The camera module of claim 1, wherein the outer shield supports at least three surfaces of the first PCB and at least three surfaces of the second PCB.

10. A vehicle comprising the camera module of claim 1.

11. The camera module of claim 1, wherein the first PCB and the second PCB are disposed in the outer shield.

12. The camera module of claim 1, wherein the first PCB and the second PCB are disposed between an upper end portion of the first lateral surface and a bottom end portion of the first lateral surface.

13. The camera module of claim 12, wherein a part of lateral surface of the first PCB directly contacts with the first lateral surface of the outer shield, and
wherein a part of lateral surface of the second PCB directly contacts with the first lateral surface of the outer shield.

14. The camera module of claim 1, wherein the outer shield comprises a second lateral surface, a third tension spring, and a fourth tension spring;
wherein the second lateral surface of the outer shield comprises a third hole and a fourth hole, and
wherein a part of the third tension spring is disposed in the third hole and a part of the fourth tension spring is disposed in the fourth hole.

15. The camera module of claim 14, wherein the first PCB comprises a third ground portion and the second PCB comprises a fourth ground portion,
wherein the third tension spring contacts with the third ground portion and the fourth tension spring contacts with the fourth ground portion.

16. A camera module, comprising:
a first PCB (printed circuit board);
a second PCB configured to supply power to the first PCB; and
an outer shield of conductive material distancing the first PCB from the second PCB at a predetermined distance,
wherein the first PCB includes a first ground portion formed of conductive material,
wherein the second PCB includes a second ground portion formed of conductive material and spaced apart from the first ground portion,
wherein the outer shield includes a tension spring bent at a portion thereof and foamed at a location corresponding to that of the first ground portion and the second ground portion,
wherein the outer shield includes at least three lateral surfaces and is formed in one body of conductive material,
wherein the outer shield electrically connects the first and second PCBs via the tension spring,
wherein a first lateral surface of the lateral surfaces of the outer shield comprises first and second through holes, and
wherein at least a part of the first tension spring is disposed in the first through hole and at least a part of the second tension spring is disposed in the second through hole.

17. The camera module of claim 16, wherein the tension spring contacts the first and second ground portions to electrically connect the outer shield to the first and second PCBs.

18. The camera module of claim 16, wherein the tension spring is integrally formed at a lateral wall of the outer shield.

19. The camera module of claim 16, further comprising:
a lens module;
an image sensor; and
a cover member configured to cover the lens module, the image sensor, and an upper surface of the first PCB.

20. The camera module of claim 16, wherein the tension spring includes a first pressure portion configured to contact the first ground portion of the first PCB, and a second pressure portion configured to the second ground portion of the second PCB.

21. The camera module of claim 20, wherein the first and second pressure portions are vertically arranged in a pair on a lateral wall of the outer shield, and
wherein the outer shield supports the first PCB and the second PCB.

* * * * *